US011407948B2

United States Patent
Nie et al.

(10) Patent No.: US 11,407,948 B2
(45) Date of Patent: Aug. 9, 2022

(54) HIGH-TEMPERATURE PYROLYSIS REACTION DEVICE

(71) Applicant: Zhejiang University of Technology, Hangzhou (CN)

(72) Inventors: Yong Nie, Hangzhou (CN); Qinglong Xie, Hangzhou (CN); Ying Duan, Hangzhou (CN); Fan Xia, Hangzhou (CN); Meizhen Lu, Hangzhou (CN); Shangzhi Yu, Hangzhou (CN); Xiaojiang Liang, Hangzhou (CN); Jianbing Ji, Hangzhou (CN)

(73) Assignee: Zhejiang University of Technology, Hangzhou (CN)

( * ) Notice: Subject to any disclaimer, the term of this patent is extended or adjusted under 35 U.S.C. 154(b) by 96 days.

(21) Appl. No.: 17/047,707

(22) PCT Filed: Dec. 28, 2018

(86) PCT No.: PCT/CN2018/124679
§ 371 (c)(1),
(2) Date: Oct. 15, 2020

(87) PCT Pub. No.: WO2019/149008
PCT Pub. Date: Aug. 8, 2019

(65) Prior Publication Data
US 2021/0115339 A1    Apr. 22, 2021

(30) Foreign Application Priority Data
Jan. 30, 2018    (CN) .......................... 201810088996.4

(51) Int. Cl.
*C10G 9/18*    (2006.01)
*B01J 4/00*    (2006.01)
(Continued)

(52) U.S. Cl.
CPC .............. *C10G 9/18* (2013.01); *B01J 4/002* (2013.01); *B01J 4/008* (2013.01); *B01J 6/008* (2013.01)

(58) Field of Classification Search
CPC ... C10G 9/18; B01J 4/002; B01J 4/008; B01J 6/008; B01J 2219/00139; B01J 6/00; B01J 19/24; B01J 19/0013
(Continued)

(56) References Cited

U.S. PATENT DOCUMENTS 10,081,590 B2 *    9/2018    Nie .................... B01J 8/0285
2012/0328467 A1 *    12/2012    Fernandez Acevedo .................... C22C 28/00
420/83

FOREIGN PATENT DOCUMENTS

CN    104341298 A    *    2/2015
CN    205527761 U    *    8/2016
(Continued)

OTHER PUBLICATIONS

CN-205527761U—machine translation (Year: 2022).*

*Primary Examiner* — Huy Tram Nguyen
(74) *Attorney, Agent, or Firm* — PROI Intellectual Property US; Klaus Michael Schmid

(57) ABSTRACT

A device for pyrolysis reactions includes a feeding pump, a flow meter, an atomizer, a pyrolysis reactor, electromagnetic coils, an electromagnetic induction heating power, a temperature sensor, a temperature controller, a condenser and a product tank. The feeding pump is connected with the flow meter which is connected to the inlet of the atomizer in the pyrolysis reactor. There is a port at the bottom of the pyrolysis reactor, with the port at the top of the pyrolysis reactor connected with the condenser. The condenser is connected with the product tank. The external wall of the pyrolysis reactor is surrounded by electromagnetic coils
(Continued)

which are connected with the electromagnetic induction heating power. The temperature sensor is placed between the pyrolysis reactor and the coils, which is connected with the temperature controller. The contact resistance between the atomized material and the hot surface can be.

6 Claims, 2 Drawing Sheets

(51) Int. Cl.
*B01J 6/00* (2006.01)
*B01J 19/24* (2006.01)

(58) Field of Classification Search
USPC .......................................................... 422/119
See application file for complete search history.

(56) References Cited

FOREIGN PATENT DOCUMENTS

| | | |
|---|---|---|
| CN | 107602322 A | 1/2018 |
| CN | 108246210 A | 7/2018 |
| CN | 208145921 U | 11/2018 |

\* cited by examiner

HIGH-TEMPERATURE PYROLYSIS REACTION DEVICE

TECHNICAL FIELD

The present invention belongs to the technical field of chemical production, and particularly relates to a novel device for pyrolysis reactions.

BACKGROUND

Pyrolysis is a chemical process in which transformation of a substance is achieved using the heat energy, and widely used in the petrochemical processes. Small-molecule olefins, alkynes and aromatic hydrocarbons, such as ethylene, propylene, butadiene, acetylene, benzene, toluene, can be obtained by pyrolysis of petroleum hydrocarbons in industrial process. In oil chemical industry, pyrolysis is usually used in the production of high value-added fine chemicals. For example, undecenoic acid methyl ester can be obtained by the pyrolysis of methyl ricinoleate, which can be used as the raw material for the production of nylon-11. In addition, pyrolysis is also widely used in organic chemical production. For instance, ketene can be produced by the pyrolysis of acetone, which is an important intermediate for organic synthesis.

Currently, the industrial pyrolysis of liquid is usually achieved by combustion pyrolysis (Chinese patents CN 1751984A, CN 102951616A and CN 106744716A). Fuel gas and air are mixed for combustion, which can provide heat for the cracking furnace to form the high temperature environment. However, the temperature of cracking furnace can be only controlled within a certain range by this method which is suitable for waste liquid treatment. It is difficult to meet the requirements of the pyrolysis reactions which require precise temperature control or are greatly influenced by temperature. Chinese patent CN 104341298A discloses pyrolysis of methyl ricinoleate by microwave heating. Nevertheless, the processing capacity is limited by the magnetron power in the microwave generation device and hence the scale-up is difficult under the current technical level. In addition, the microwave absorbing materials are needed as the heating medium, which increases the cost.

Electromagnetic induction heating is widely used due to its excellent heating performance (Chinese patents CN 103561491A, CN 105025604A, CN 107477844A and CN 107339796A). This heating method has the advantages of fast heating start, high thermal efficiency and good heating uniformity. In addition, the electromagnetic induction heating coil is not heated itself with low heat blockage and thermal inertia, and thus the precise temperature control can be achieved. Moreover, the scale-up of device and capacity can be easily achieved for the electromagnetic induction heating method. For the spray technology, liquid feedstock is broken into uniform and fine droplets, and efficient heat transfer can be achieved. The spray technology is widely used in cooling, combustion and pyrolysis (Chinese patents CN 102951616A, CN 103740904A, CN 104061797A, CN 106744716A and CN 106987691A). The main advantage of heat transfer using spray technology lies in no contact resistance between the atomized material and the heat transfer surface, and thus the efficient and rapid heat transfer is achieved for the atomized material. Rapid heating and pyrolysis of feedstock can be realized when the spray technology is applied in the pyrolysis reactions. Few reports on application of electromagnetic induction heating coupled with spray technology in pyrolysis reactions were found.

SUMMARY

The present invention intends to overcome the deficiencies of the known techniques and provides a novel device for pyrolysis reactions.

The objective of the present invention is achieved by the following technical scheme. The novel device for pyrolysis reactions comprises: a feeding pump, a flow meter, an atomizer, a pyrolysis reactor, electromagnetic coils, an electromagnetic induction heating power, a temperature sensor, a temperature controller, a condenser and a product tank. The feeding pump is connected with the flow meter which is connected to the inlet of the atomizer in the pyrolysis reactor. There is a port at the bottom of the pyrolysis reactor, with the port at the top of the pyrolysis reactor connected with the condenser. The condenser is connected with the product tank. The external wall of the pyrolysis reactor is surrounded by electromagnetic coils which are connected with the electromagnetic induction heating power. The temperature sensor is placed between the pyrolysis reactor and the coils, which is connected with the temperature controller.

Preferably, the pyrolysis reactor is designed with a port at the top. The pyrolysis reactor can be made of stainless iron, carbon steel, iron or other high temperature resistant and magnetically permeable materials.

Preferably, the atomizer is in the middle of the pyrolysis reactor, which can be nozzle type or centrifugal type. The nozzle(s) of the nozzle type atomizer can be single, multiple at one layer, or multiple at multiple layers. The nozzle(s) of the nozzle type atomizer can be fixed or rotary with the vertical feeding pipe as the axis. The atomizer can be made of stainless steel, copper or other high temperature resistant materials with low magnetic permeability.

Preferably, the temperature sensor can be a thermocouple or a thermistor. The temperature measurement point is in the middle of the electromagnetic coils.

Preferably, the feedstock introduced by the feeding pump can be liquid or slurry fluid.

Preferably, the condenser is designed with four ports (91, 92, 93, and 94) and the product tank is designed with three ports (101, 102 and 103). The port of the condenser (91) is connected with the port at the top of the pyrolysis reactor. The port of the condenser (92) is connected with the port of the product tank (101).

The present invention provides a process of using the novel device for pyrolysis reactions, with specific steps as follows:

1. Set the temperature of the pyrolysis reaction and turn on the electromagnetic induction heating power to start the heating of electromagnetic coils;

2. Transport the feedstock using the feeding pump; the feedstock is atomized into fine droplets by the atomizer followed by being metered with the flow meter; the droplets are sprayed onto the inner wall of the pyrolysis reactor and then the pyrolysis reaction takes place.

3. The feedstock is rapidly pyrolyzed into gaseous product at the set temperature; the pyrolysis gas flows through the discharging pipe and enters the product tank after being condensed in the condenser.

The beneficial effects of the present invention are as follows: 1. The process of electromagnetic induction heating adopts the internal heating method. The heating method has the advantages of fast heating start, high thermal efficiency, low thermal inertia and good heating uniformity, which can provide a uniform and stable place for the high temperature reactions. The scale-up of device and capacity can be easily achieved for the electromagnetic induction heating method.

2. The contact resistance between the atomized material and the hot surface can be eliminated using the spray technology. Hence, the rapid heating and pyrolysis of feedstock is realized, which reduces the reaction time, improves the reaction efficiency and increases the yields of the target products.

EXPLANATION OF THE REFERENCE SIGNS

1: feeding pump, 2: flow meter, 3: atomizer, 4: pyrolysis reactor, 5: electromagnetic coils, 6: electromagnetic induction heating power, 7: temperature sensor, 8: temperature controller, 9: condenser, 10: product tank, 31: inlet of atomizer, 41: top port of pyrolysis reactor, 42: bottom port of pyrolysis reactor, 91-94: ports of condenser, 101-103: ports of product tank.

PREFERRED EMBODIMENTS

A detailed description of preferred embodiments of this invention is presented as follows.

Figure 1:
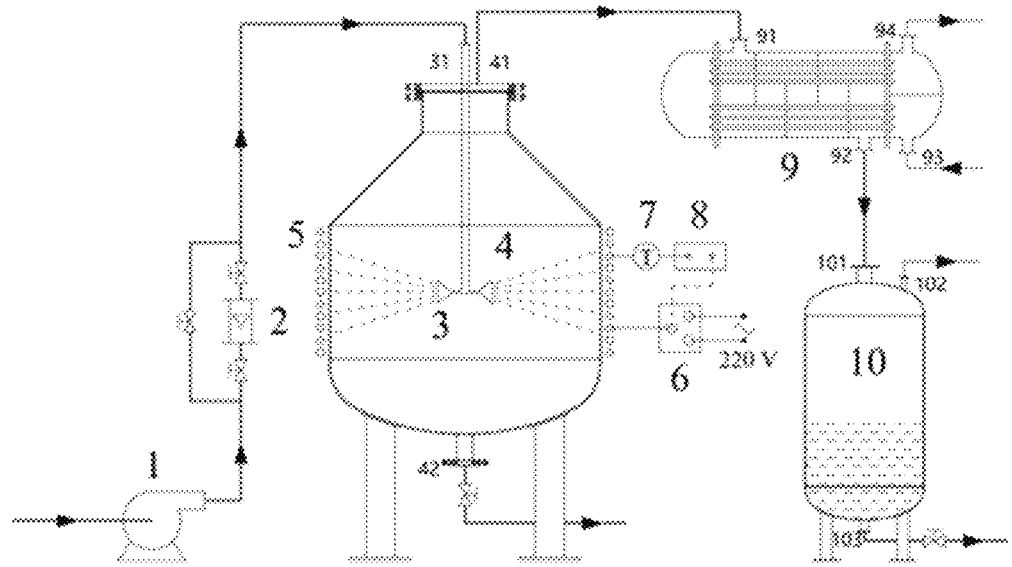
FIG. 1 shows a diagram of the process and device according to the present invention (nozzle type atomizer).

As shown in FIG. 1, the novel device for pyrolysis reactions comprises, among other parts, a feeding pump (1), a flow meter (2), an atomizer (3), a pyrolysis reactor (4), electromagnetic coils (5), an electromagnetic induction heating power (6), a temperature sensor (7), a temperature controller (8), a condenser (9) and a product tank (10). The feeding pump (1) is connected with the flow meter (2) which is connected to the inlet (31) of the atomizer (3) in the pyrolysis reactor (4). There is a port (42) at the bottom of the pyrolysis reactor (4), with the port (41) at the top of the pyrolysis reactor (4) connected with the condenser (9). The condenser (9) is connected with the product tank (10). The external wall of the pyrolysis reactor (4) is surrounded by electromagnetic coils (5) which are connected with the electromagnetic induction heating power (6). The temperature sensor (7) is placed between the pyrolysis reactor (4) and the coils (5), which is connected with the temperature controller (8).

Preferably, the pyrolysis reactor (4) is designed with a port (41) at the top. The pyrolysis reactor (4) can be made of stainless iron, carbon steel, iron or other high temperature resistant and magnetically permeable materials.

Preferably, the atomizer (3) is in the middle of the pyrolysis reactor (4), which can be nozzle type or centrifugal type. The nozzle(s) of the nozzle type atomizer can be single, multiple at one layer, or multiple at multiple layers. The nozzle(s) of the nozzle type atomizer can be fixed or rotary with the vertical feeding pipe as the axis. The atomizer (3) can be made of stainless steel, copper or other high temperature resistant materials with low magnetic permeability.

Preferably, the temperature sensor (7) can be a thermocouple or a thermistor. The temperature measurement point is in the middle of the electromagnetic coils (5).

Preferably, the feedstock introduced by the feeding pump (1) can be liquid or slurry fluid.

Preferably, the condenser (9) is designed with four ports (91, 92, 93, and 94) and the product tank is designed with three ports (101, 102 and 103). The port (91) of the condenser (9) is connected with the port (41) at the top of the pyrolysis reactor (4). The port (92) of the condenser (9) is connected with the port of the product tank (101).

The present invention provides a process of using the novel device for pyrolysis reactions, with specific steps as follows:

1. Set the temperature of the pyrolysis reaction and turn on the electromagnetic induction heating power (6) to start the heating of electromagnetic coils (5);

2. Transport the feedstock using the feeding pump (1); the feedstock is atomized into fine droplets by the atomizer (3) followed by being metered with the flow meter (3); the droplets are sprayed onto the inner wall of the pyrolysis reactor (4) and then the pyrolysis reaction takes place.

3. The feedstock is rapidly pyrolyzed into gaseous product at the set temperature; the pyrolysis gas flows through the discharging pipe and enters the product tank (10) after being condensed in the condenser (9).

Figure 3:
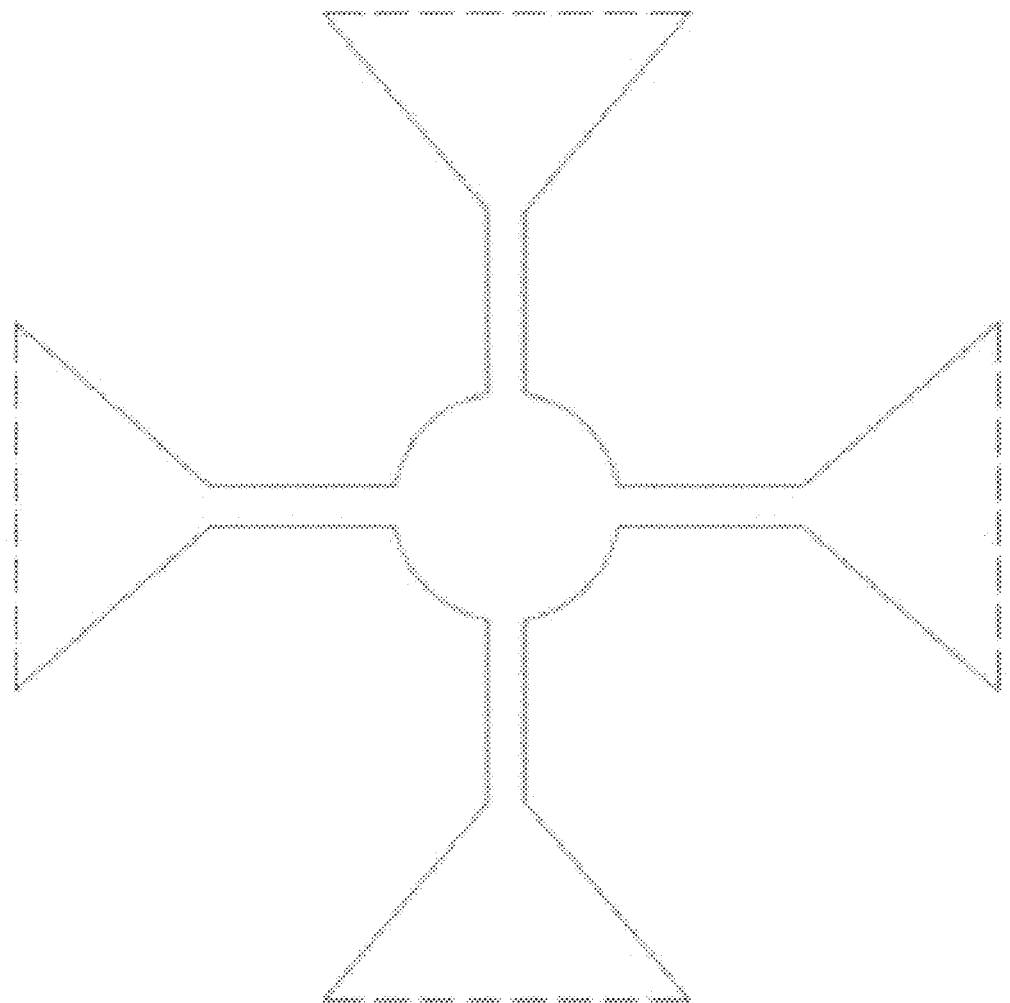
FIG. 3 shows a diagram of nozzle distribution for the multi-nozzle type atomizer according to the present invention.

As an embodiment of the invention (embodiment 1): undecylenic acid methyl ester is produced using high purity (>99%) methyl ricinoleate as the raw material. The fixed nozzle type atomizer (3) is used which has totally four nozzles, with the nozzle distribution shown in FIG. 3. As shown in FIG. 1, the electromagnetic coils (5) are evenly surrounded around the outer wall of the pyrolysis reactor (4). The temperature of the pyrolysis reaction is set at 500 degrees centigrade. The nozzle type atomizer (3) is placed in the middle of the pyrolysis reactor (4). The inlet (31) of the nozzle type atomizer (3) is connected with the feeding pipe. The top port (41) of the pyrolysis reactor (4) is connected with the discharging pipe which is connected to the condenser (9). The ports (93) and (94) of the condenser (9) are the inlet and the outlet of chilled water, respectively. The electromagnetic coils (5) start working and the pyrolysis reactor (4) is heated once the electromagnetic induction heating power (6) is turned on. After the temperature reaches the set value and stabilizes for a period of time, the feedstock (methyl ricinoleate of high purity) with the flow rate of 20 kg/h is transported by the feeding pump (1) to the inlet (31) of the nozzle type atomizer (3) followed by being metered with the flow meter (2). The feedstock is atomized by the nozzle type atomizer (3) into fine droplets which are sprayed onto the inner wall of the pyrolysis reactor (4) and then the pyrolysis reaction takes place. The feedstock is rapidly pyrolyzed at the set temperature to produce methyl undecylenate and heptanal gases which flow through the outlet (41) of the pyrolysis reactor (4) to the top port (91) of the condenser (9). The condensed liquid is discharged from the port (92) of the condenser (9), and then enters the product tank (10) through the port (101) of the product tank (10). The port (102) of the product tank (10) can be connected with a vacuum pump, which can provide condition of negative pressure for the pyrolysis system. The residual liquid in the pyrolysis reactor (4) is discharged from the bottom port (42) of the pyrolysis reactor (4). The pyrolysis product is separated and purified by rectification to obtain methyl undecylenate which can be converted to undecylenic acid through saponification and acidification. Results of the embodiment are as follows: the liquid yield is 90% and the yield of undecylenic acid is 73%. By comparison, the yield of undecylenic acid is only 34-38% in the conventional electrical heating process, as reported by Chinese patent CN101289383A. Therefore, the yield of undecylenic acid can be doubled according to the present invention.

Figure 2:
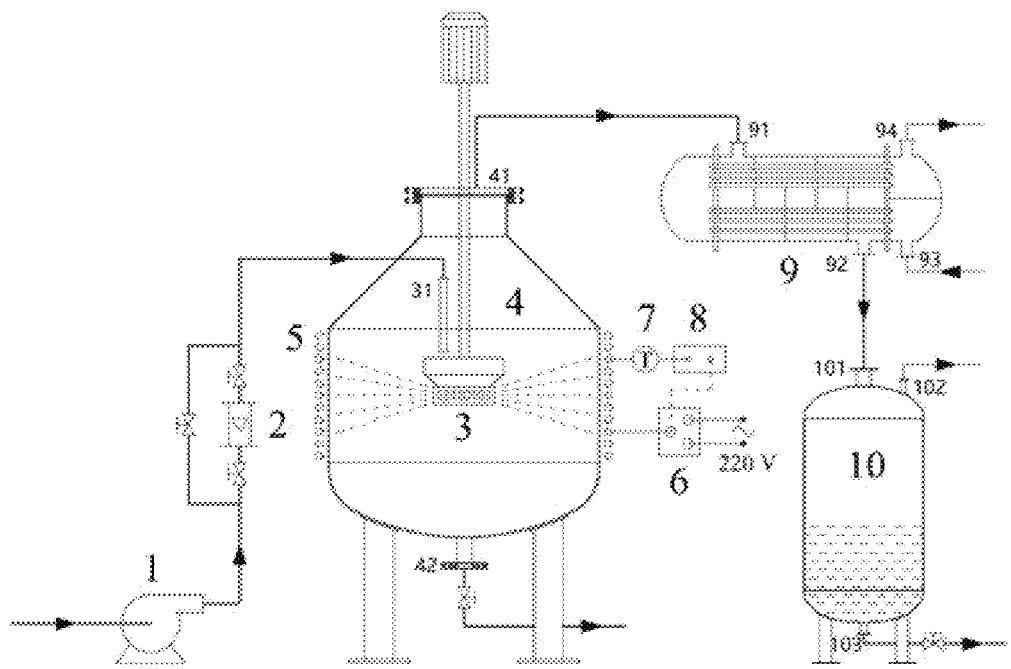
FIG. 2 shows a diagram of the process and device according to the present invention (centrifugal type atomizer).

As an embodiment of the invention (embodiment 2): undecylenic acid methyl ester is produced using high purity (>99%) methyl ricinoleate as the raw material. The centrifugal type atomizer (3) is used. As shown in FIG. 2, the electromagnetic coils (5) are evenly surrounded around the outer wall of the pyrolysis reactor (4). The temperature of the pyrolysis reaction is set at 500 degrees centigrade. The centrifugal type atomizer (3) is placed in the middle of the pyrolysis reactor (4). The inlet (31) of the centrifugal type atomizer (3) is connected with the feeding pipe. The top port (41) of the pyrolysis reactor (4) is connected with the discharging pipe which is connected to the condenser (9). The ports (93) and (94) of the condenser (9) are the inlet and the outlet of chilled water, respectively. The electromagnetic coils (5) start working and the pyrolysis reactor (4) is heated once the electromagnetic induction heating power (6) is turned on. After the temperature reaches the set value and stabilizes for a period of time, the feedstock (methyl ricinoleate of high purity) with the flow rate of 50 kg/h is transported by the feeding pump (1) to the inlet (31) of the centrifugal type atomizer (3) followed by being metered with the flow meter (2). The feedstock is atomized by the high speed rotating spray tray into fine droplets which are sprayed onto the inner wall of the pyrolysis reactor (4) and then the pyrolysis reaction takes place. The feedstock is rapidly pyrolyzed at the set temperature to produce methyl undecylenate and heptanal gases which flow through the outlet (41) of the pyrolysis reactor (4) to the top port (91) of the condenser (9). The condensed liquid is discharged from the port (92) of the condenser (9), and then enters the product tank (10) through the port (101) of the product tank (10). The port (102) of the product tank (10) can be connected with a vacuum pump, which can provide condition of negative pressure for the pyrolysis system. The residual liquid in the pyrolysis reactor (4) is discharged from the bottom port (42) of the pyrolysis reactor (4). The pyrolysis product is separated and purified by rectification to obtain methyl undecylenate which can be converted to undecylenic acid through saponification and acidification. Results of the embodiment are as follows: the liquid yield is 92% and the yield of undecylenic acid is 70%. By comparison, the yield of undecylenic acid is only 34-38% in the conventional electrical heating process, as reported by Chinese patent CN101289383A. Therefore, the yield of undecylenic acid can be doubled according to the present invention.

Preferably, the port (102) of the product tank (10) is connected to the atmosphere or a vacuum pump which can provide condition of negative pressure for the pyrolysis system.

It can be understood that as for technical staff in the present field, equivalent replacements or changes to the technical scheme or inventive concept in the present invention should be protected according to the claims in the present invention.

What is claimed is:

1. A device for pyrolysis reactions comprising:
   a feeding pump,
   a flow meter,
   an atomizer having an inlet,
   a pyrolysis reactor having a port at a bottom and a ort at a top,
   electromagnetic coils,
   an electromagnetic induction heating power,
   a temperature sensor,
   a temperature controller,
   a condenser and
   a product tank,
   wherein the feeding pump is connected with the flow meter which is connected to the inlet of the atomizer in the pyrolysis reactor
   wherein the port at the top of the pyrolysis reactor is connected with the condenser,
   wherein the condenser is connected with the product tank,
   wherein the external wall of the pyrolysis reactor is surrounded by the electromagnetic coils which are connected with the electromagnetic induction heating power,
   wherein the temperature sensor is placed between the pyrolysis reactor and the electromagnetic coils, wherein the temperature sensor is connected with the temperature controller, and
   wherein the atomizer is centrally positioned inside the pyrolysis reactor.

2. The device for pyrolysis reactions according to claim 1, wherein pyrolysis reactor is made of a material selected from one of stainless iron, carbon steel, iron and high temperature resistant and magnetically permeable materials.

3. The device for pyrolysis reactions according to claim 1,
   wherein the atomizer is one of a nozzle type atomizer and a centrifugal type atomizer,
   wherein the nozzle type atomizer includes one of single nozzle, multiple nozzles at single layer, and multiple nozzles at multiple layers,
   wherein a nozzle of the nozzle type atomizer is mounted to a vertical feeding pipe having an axis, wherein said nozzle is one of fixedly mounted to the feeding pipe and rotatable mounted to the feeding pipe,
   wherein the atomizer is made of a material selected from one of stainless steel, copper and high temperature resistant materials with low magnetic permeability.

4. The device for pyrolysis reactions according to claim 1, the temperature sensor is configured as one of a thermocouple and a thermistor, wherein the temperature sensor is arranged to have a temperature measurement point at a center of the electromagnetic coils.

5. The device for pyrolysis reactions according to claim 1, wherein the feeding pump is configured to introduce at least one of liquid feedstock and slurry fluid feedstock.

6. The device for pyrolysis reactions according to claim 1, wherein the condenser includes four ports and the product tank includes three ports, wherein a first port of the condenser is connected with the port at the top of the pyrolysis reactor, and wherein a second port of the condenser is connected with an input port of the product tank.

* * * * *